(No Model.)
L. SCOFIELD.
FURNITURE CASTER.
No. 357,340. Patented Feb. 8, 1887.
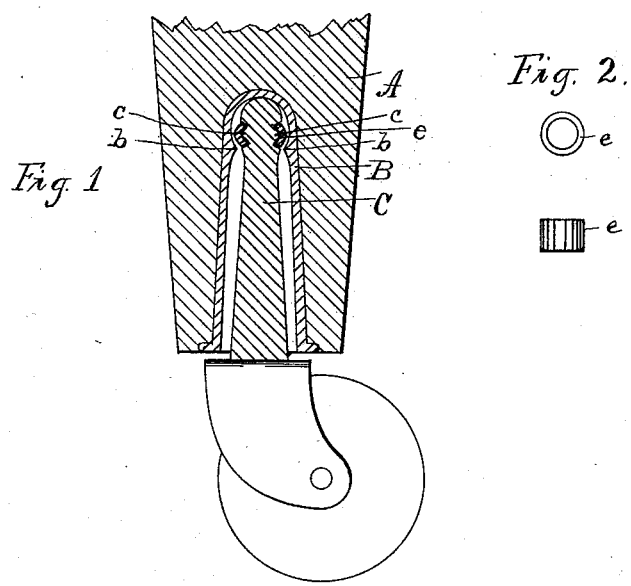
WITNESSES:
E. L. Thurston
O. A. Sherburne
INVENTOR
Levi Scofield
BY Hill & Dixon
ATTORNEYS

UNITED STATES PATENT OFFICE.

LEVI SCOFIELD, OF GRAND HAVEN, MICHIGAN.

FURNITURE-CASTER.

SPECIFICATION forming part of Letters Patent No. 357,340, dated February 8, 1887.

Application filed September 9, 1886. Serial No. 213,113. (No model.)

*To all whom it may concern:*

Be it known that I, LEVI SCOFIELD, of Grand Haven, in the county of Ottawa and State of Michigan, have invented certain new and useful Improvements in Furniture-Casters, of which the following is a description, reference being had to the accompanying drawings, in which—

Figure 1 is an axial section of the complete caster, and Fig. 2 represents the rubber band.

The invention relates to that class of furniture-casters in which the spindle of the caster is removably held in the socket by means of a rubber or other equivalent elastic band attached to said spindle and acting in connection with a projecting shoulder or shoulders on the inner wall of the socket.

In the drawings, A represents the leg of the table or other article of furniture.

B represents the ordinary thimble shaped socket, of any suitable form or construction, applied to said leg in any of the usual ways, or in any suitable way, and C represents the spindle of the caster arranged within the socket.

The socket is provided with an interior shoulder or shoulders, $b\ b$. The spindle is provided with a band, $e$, of soft rubber or other equivalent elastic material, which will be compressed by the shoulders $b$, so as to pass by them when the spindle is forced into its socket, and which will then expand above or behind the shoulder, and thereby retain the spindle normally in place, but permit of its removal when desirable.

As heretofore constructed the rubber has been applied in the form of a disk or band stretched over the spindle and contracted into a groove formed around it. When so applied, it does not hold its position perfectly, and does not operate satisfactorily, and, in fact, has been found to be substantially worthless for practical use.

The object of my invention has been to devise some improved means of holding and applying the elastic band that would obviate the difficulties heretofore met with in this class of devices, which object is accomplished as follows:

I construct the groove around the spindle with a rib, $c$, about midway between its upper and lower edges, and then stretch over it the rubber band, the edges of which will contract into the deep parts of the groove, while the middle is bulged out by the rib, as shown in Fig. 1. The band may be of any ordinary form, as shown in Fig. 2. The rib may be of any form which will bulge out the middle of the rubber without cutting into it. The depressions of the groove on each side of the rib $c$ are necessary to receive the edges of the band and wholly or partially countersink them, so as to prevent the band from slipping or creeping out of position. Two or more parallel grooves, with suitable ribs or ridges between them to countersink the edges of the band while bulging out its intermediate parts, will act as the equivalent of my construction.

Having thus described my invention, what I claim as new, and desire to secure by Letters Patent, is—

The combination of the caster-spindle having the groove or grooves and rib or ribs herein described, with the band $e$, and the socket having the internal shoulders, $b$, substantially as and for the purpose specified.

LEVI SCOFIELD.

Witnesses:
  E. L. THURSTON,
  E. A. SHERBURNE.